March 12, 1940.  H. J. SCHRADER  2,193,079
METHOD OF AND APPARATUS FOR MEASURING TORSIONAL MOVEMENTS
Filed April 25, 1936  2 Sheets-Sheet 1

Inventor
Harold J. Schrader
Attorney

March 12, 1940.   H. J. SCHRADER   2,193,079
METHOD OF AND APPARATUS FOR MEASURING TORSIONAL MOVEMENTS
Filed April 25, 1936   2 Sheets-Sheet 2
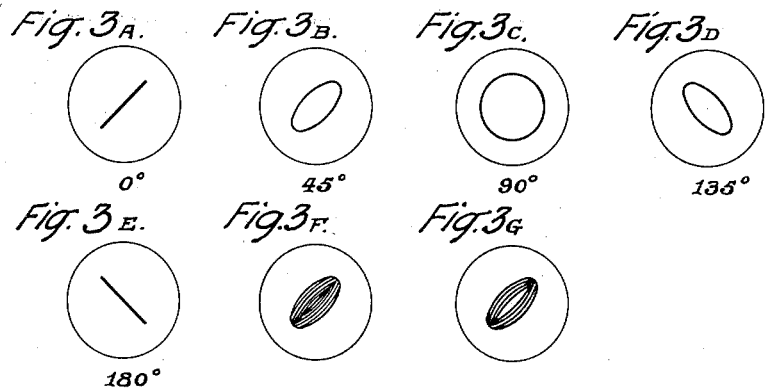
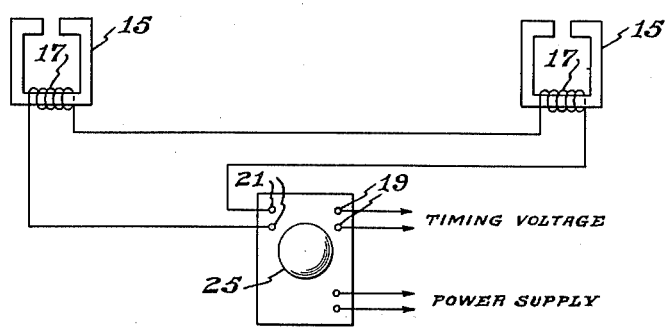
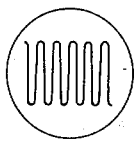
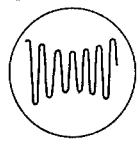
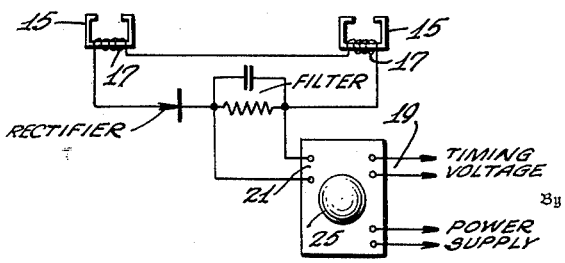
Inventor
Harold J. Schrader
By
Attorney Patented Mar. 12, 1940

2,193,079

UNITED STATES PATENT OFFICE 2,193,079

METHOD OF AND APPARATUS FOR MEASURING TORSIONAL MOVEMENTS

Harold J. Schrader, Haddon Heights, N. J., assignor to Radio Corporation of America, a corporation of Delaware Application April 25, 1936, Serial No. 76,390

9 Claims. (Cl. 73—51)

My invention relates to a method of and apparatus for measuring torsional vibration, or torsional movement of a moving shaft. More specifically my invention is an apparatus in which voltages, generated by a pair of alternators attached to the shaft whose frequency and amplitude of torsional movements is to be measured, are applied to the deflecting electrodes of a cathode ray oscillograph or other suitable indicating device to thereby indicate torsional movements of the shaft.

I am aware of the method of making torsional measurements by the observation of the relative phase angle of currents generated by devices attached to the shaft under observation. In general such methods have involved complicated cumbersome apparatus. While these methods have been useful in measuring the angle caused by the torsional twist, neither the apparatus nor the method have been entirely satisfactory in the case of relatively low power devices or in the measurement of torsional vibration as distinguished from torsional twist.

One of the objects of my invention is found in a method for measuring the frequency and amplitude of torsional vibration in a moving shaft by means of apparatus which consumes a negligible amount of power.

Another object is to provide an inexpensive, light weight apparatus for measuring torsional vibration by means of an electrically deflected cathode ray.

A further object is to combine in a single apparatus the means for measuring torsional twist, torsional vibration, or the power transmitted through a rotating shaft.

My invention may be best understood by reference to the accompanying drawings in which Figure 1 represents a schematic arrangement of one embodiment of my invention, Fig. 2 is an elevational view representing parts of one of the alternators of Fig. 1, Figs. 3A to 3E are illustrations of cathode ray patterns showing torsional twist. The figures represent the patterns obtained when the phase of the two voltages varies over 180°. Figs. 3F and 3G illustrate the effect of torsional vibration.

Fig. 4 illustrates schematically a modification, for measuring torsional vibration, of the circuit arrangement of Fig. 1, Figs. 5J and 5K are illustrations of patterns before and after the occurrence of torsional vibration. Fig. 5L is the curve obtained by demodulating the curve of Fig. 5K.

Fig. 6 is a schematic diagram of a modification of the circuit of Fig. 1.

Figure 1:
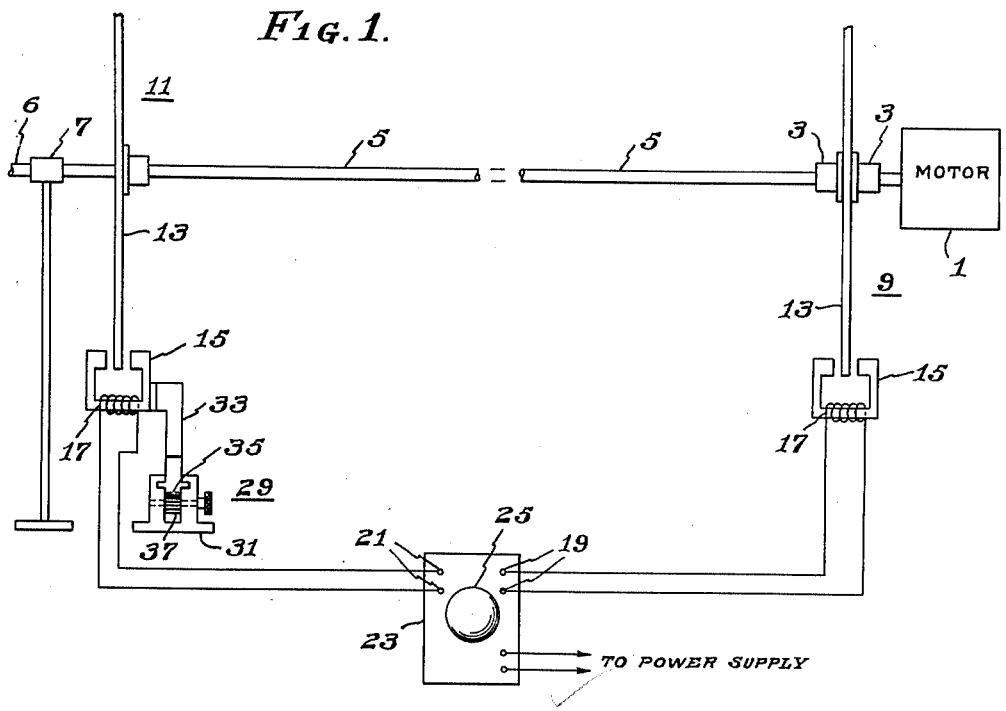

In Fig. 1 a motor 1, or other source of motive power, is connected by coupling 3 to a shaft 5 which may be supported at its remote end by a bearing 7. A pair of alternators 9, 11 are mounted on the shaft 5. Each alternator 9, 11 comprises an aluminum or copper radially slotted disc 13, a magnetic yoke 15, and a pick-up winding 17. The slotted discs 13 may, by way of example, be of the order of twelve inches in diameter, by one-eighth of an inch thick; the radial slots may number approximately forty-eight and may be one-eighth to one-quarter inch wide and about one-inch deep. The pole pieces of the yoke are separated to permit the disc to freely pass without touching. The surfaces of the teeth between the slots and the surfaces of the pole pieces are approximately of similar size and shape. The shaping of the pole pieces and teeth determines the output wave form, which is preferably sinusoidal; although my invention is not limited to any particular wave form.

The pickup windings 17 are connected to the deflecting electrodes represented by binding posts 19—21 of a cathode ray oscillograph 23 which is operated from a power source not shown. Inasmuch as the cathode ray oscillograph is not per se my invention, and since such devices are commercially available, no detailed description is required. One suitable commercial cathode ray oscillograph is the RCA TMV122B. It suffices to say that the cathode ray pattern may be shown on the screen represented by numeral 25.

Figure 2:
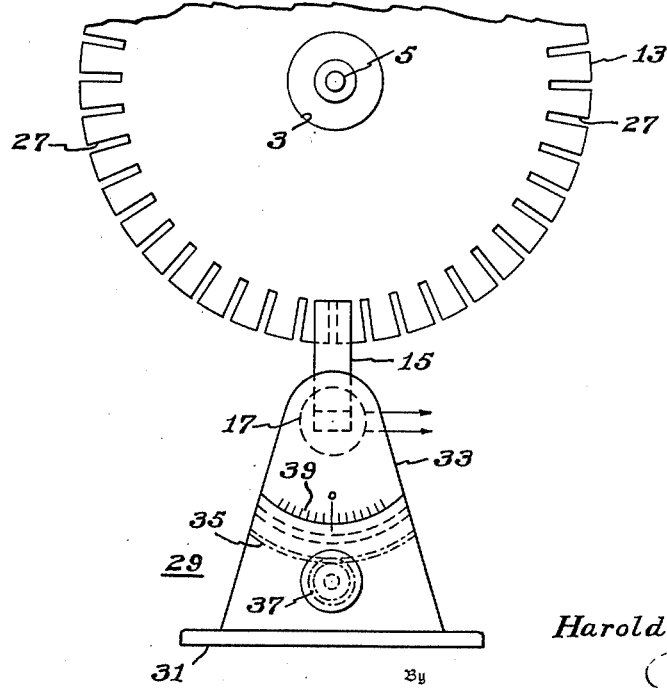

In Fig. 2 an elevational view of parts of one of the generators shows a fragment of the slotted disc 13 in which slots 27 are indicated. It should be understood that a large number of slots are preferred. Increasing the number of slots increases the sensitivity of the machine as will hereinafter appear. The field, including the yoke 15 and pickup winding 17, is mounted in a suitable frame 29 which permits the field to be rotated about the circumference of the generator. The frame 29 may include a lower fixed portion 31 and an upper rotatable portion 33. The center about which the upper portion 33 rotates is preferably the center of the shaft 5. A rack 35 and gear 37 may be used to move the upper portion. A suitable scale 39 is used to indicate the angle through which the field is rotated.

The method of operation is as follows: with the shaft 5 at rest, the relative position of the fields 15—17 and rotors 13 is adjusted so that the alternators 9, 11 are in proper position to generate in phase voltages. In this position the voltages generated by the two alternators, if no torsional twist occurs in the rotating shaft, will be exactly in phase. If two in phase alternating voltages are impressed on the deflecting electrodes of a cathode ray tube, the resultant deflection will be shown on the cathode ray screen as a straight line which is inclined as shown in Fig. 3A. If a load is applied to the free end 6 of the shaft, or if for any reason a torsional twist takes place in the shaft, the alternators will no longer generate in phase voltages, but one or the other voltage will lag. If such lag is 45°, the cathode ray pattern will be an ellipse as shown in Fig. 3B. If the phase displacement increases progressively from 0° to 180°, the cathode ray pattern will gradually change from Fig. 3A through 3B, 3C, and 3D to 3E.

In the several patterns of Fig. 3 the phase angles 0° to 180° appear. These angles represent the phase of the alternator voltages, but since the number of alternations per revolution of the shaft depends upon the number of generator teeth or slots, the angular twist of the shaft may be determined from the following equation.

$$\text{Angular torsional twist} = \frac{\text{phase angle of alternator voltages}}{\text{number of alternations per shaft revolution}}$$

Thus it will be seen that increasing the number of generator teeth, or alternations per revolution, increases the accuracy or sensitivity of the measurement. Instead of estimating the torsional displacement or twist from the change in cathode ray pattern, I prefer to establish the zero phase angle of the generator voltages for the stationary shaft, and restore the same condition after torsional displacement by rotating one field with respect to the other by means of the arrangement 29 illustrated in Figs. 1 and 2. The angular movement required to restore zero phase angle will be equal to the angular torsional twist of the shaft.

In the event that the shaft has a torsional vibration, the alternator voltages will rapidly assume different phase angles which will trace numerous patterns on the cathode ray screen. These numerous patterns will appear as shown in Fig. 3F. By moving one of the fields with respect to the other, as previously described, two positions will be found in which the pattern will just open at the center as shown in Fig. 3G. The angle between the two positions at which the pattern just opens is the total angle of the torsional vibration, and is called the amplitude of torsional vibration.

A modified circuit is shown in Fig. 4. The generator pickup coils 15, 17 are serially connected. The serially connected coils are connected to the binding posts 21 which are connected to one pair of deflecting electrodes. The other deflecting electrodes are connected to binding posts 19 which are connected to a sweep circuit or timing voltage. The sweep circuit is generally part of the cathode ray oscillograph and is built into the instrument so that a switch mechanism applies the voltage to the proper deflecting electrodes. The effect of the sweep circuit is to move the cathode ray across the screen. The resultant pattern from this connection is shown in Fig. 5J. The alternations are equivalent to the sum of the voltages of the alternators. In the pattern 5J it is assumed that no torsional vibration is present. In the event that torsional vibration appears, the alternator voltages will no longer be in phase and will produce a modulated resultant voltage pattern which is shown in Fig. 5K. The frequency of the torsional vibration will be the frequency of the modulation effected in the generator voltages.

Instead of applying the voltages from the alternator to the deflecting electrodes as shown in Fig. 4, a detector and filter may be included in the connection which will give the envelope of the modulated voltages as shown in Fig. 6. The resultant pattern 5L is similar to 5J but the pattern 5L shows the voltages resulting from the torsional vibration and omits the voltages of the alternator frequency. The curve obtained can therefore be used to measure the actual frequency of torsional vibration. This may be done, for example, by calibrating the frequency of the timing voltage and adjusting it until a curve is obtained which represents a single cycle. It should be understood that the cathode ray tube may be calibrated in terms of the transmitted power for any given speed. That is, the applied power will produce certain torsional twists or angular shaft displacements and if the pattern is observed for varying amounts of applied power, the power transmitted at a particular rate of shaft rotation can thereafter be estimated from the pattern, or the scale 39 on the field rotating means may be appropriately calibrated.

In any event, very small amounts of power are required for the deflection of a cathode ray beam, and such power may be amplified by suitable connected thermionic, or the like, amplifiers. In the arrangement shown, the aluminum rotors have negligible effect on the system under observation. The power required is so low that the system is not appreciably affected. Thus the cathode ray oscillograph connected to the alternators as shown, permits determination of torsional twisting, torsional vibration or power transmitted.

I claim as my invention:

1. An apparatus for observing torsional movements in a driven shaft which comprises a pair of generators of alternating voltages so arranged with respect to said shaft that in phase voltages are generated when no torsional movements exist, a cathode ray oscillograph including pairs of ray deflecting means, connections from said generators to a first pair of ray deflecting means for applying deflecting voltages to said ray, a source of variable voltage for deflecting said cathode ray, connections from another of said pairs of deflecting means to said source of variable voltage, means for applying to said first ray deflecting means the voltages of modulation frequencies caused by torsional movements of said generators, and means for eliminating the voltages of the generators per se from said first ray deflecting means.

2. The method of measuring the amplitude of torsional vibration in a rotating shaft which includes the steps of generating normally in phase currents at each end of said shaft by the rotation thereof, applying a torsional load to said shaft, combining said currents to obtain traces which form Lissajous figures in which variations due to torsional vibration appear as a plurality of ellipses closely positioned along the same axis, adjusting the phase of one of said currents until a position is found in which an opening just appears in the center of said trace, and readjusting the phase of said current until another position is found in which an opening just appears in the center of said trace, and measuring the angle between said two positions to obtain the amplitude of torsional vibration.

3. The method of measuring the amplitude of torsional vibration in a rotating shaft which includes the steps of generating normally in-phase currents at each end of said shaft by the rotation thereof, applying forces causing torsional vibration in said shaft, combining said currents to obtain traces which form Lissajous figures, indicating the change in said Lissajous figures caused by torsional vibrations in said shaft, rotating the phase of one of said currents between two angular positions which define the reoccurrence of a predetermined trace and measuring said angle of rotation, said angle being equal to the amplitude of torsional vibration.

4. The method of measuring the frequency of torsional vibration in a rotating shaft with a cathode ray tube which includes the steps of generating normally in-phase alternating voltages at each end of said shaft by the rotation thereof, applying forces causing torsional vibration in said shaft, connecting said voltages in series, deflecting said cathode ray in a first direction by said voltages, deflecting said cathode ray in a direction at right angles to said first direction, determining the normal deflections of said cathode ray, and measuring the modulation of said normal deflection effected by torsional vibrations of said shaft.

5. The method of measuring the frequency of torsional vibration in a rotating shaft which includes the steps of generating normally in-phase alternating voltages at each end of said shaft by the rotation thereof, applying forces causing torsional vibration in said shaft, connecting said voltages in series, rectifying said voltages to obtain a modulation component caused by said vibrations, and measuring the frequency of said modulation component to thereby determine the frequency of said vibration.

6. The combination which includes a pair of alternators mounted at separated points on a driven shaft which is subject to torsional vibration, an indicator, means connecting said alternators to said indicator, and means including said indicator for quantitatively measuring said torsional vibration.

7. An apparatus for measuring the amplitude of torsional vibration in a driven shaft which comprises a pair of generators of alternating voltages, said generators being so arranged with respect to said shaft that voltages of a certain relative phase are generated when no torsional distortion exists and voltages of other relative phases are generated when said shaft is subjected to torsional distortion, a cathode ray oscillograph including pairs of mutually perpendicular ray deflecting means, connections from one of said generators to one of said pairs of deflecting means and connections from the other of said generators to the other of said pairs of deflecting means so that said alternating voltages cause said ray to trace patterns which are a function of the phase of said voltages.

8. An apparatus for measuring the amplitude of torsional vibration in a driven shaft which comprises a pair of generators of alternating voltages, said generators being so arranged with respect to said shaft that voltages of a certain relative phase are generated when no torsional distortion exists and voltages of other relative phases are generated when said shaft is subjected to torsional distortion, a cathode ray oscillograph including pairs of mutually perpendicular ray deflecting means, connections from one of said generators to one of said pairs of deflecting means and connections from the other of said generators to the other of said pairs of deflecting means, and means including said patterns for quantitatively measuring torsional vibration in said shaft.

9. The combination which includes a pair of alternating voltage generators mounted at separated points on a driven shaft which is subject to torsional vibration, an indicator means for impressing said alternating voltages on said indicator, said indicator being adapted to produce a trace whose pattern is a function of the phase of said voltages, and means including said trace for quantitatively measuring the amplitude of said torsional vibration.

HAROLD J. SCHRADER.